US009738756B2

(12) United States Patent
Häffner et al.

(10) Patent No.: US 9,738,756 B2
(45) Date of Patent: Aug. 22, 2017

(54) METHOD FOR PRODUCING HIGHLY VISCOUS POLYAMIDES

(71) Applicant: BASF SE, Ludwigshafen (DE)

(72) Inventors: Rüdiger Häffner, Neustadt (DE); Rolf-Egbert Grützner, Rudolstadt (DE); Achim Stammer, Freinsheim (DE); Angela Ulzhöfer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/888,243

(22) PCT Filed: Apr. 30, 2014

(86) PCT No.: PCT/EP2014/058797
§ 371 (c)(1),
(2) Date: Oct. 30, 2015

(87) PCT Pub. No.: WO2014/177603
PCT Pub. Date: Nov. 6, 2014

(65) Prior Publication Data
US 2016/0075828 A1    Mar. 17, 2016

(30) Foreign Application Priority Data

May 2, 2013  (EP) .................................... 13166227

(51) Int. Cl.
*C08G 69/46* (2006.01)
*C08G 69/06* (2006.01)
*C08G 69/30* (2006.01)
*C08J 5/18* (2006.01)

(52) U.S. Cl.
CPC ............. *C08G 69/46* (2013.01); *C08G 69/06* (2013.01); *C08G 69/30* (2013.01); *C08J 5/18* (2013.01); *C08J 2377/02* (2013.01)

(58) Field of Classification Search
None
See application file for complete search history.

(56) References Cited

U.S. PATENT DOCUMENTS

| 3,228,898 A | 1/1966 | Illing et al. |
| 4,053,457 A | 10/1977 | Cordes et al. |
| 5,234,644 A | 8/1993 | Schütze et al. |
| 5,663,284 A | 9/1997 | Kominami et al. |
| 5,773,555 A | 6/1998 | Weger et al. |
| 6,326,457 B1 | 12/2001 | Erbes et al. |
| 6,754,979 B2 | 6/2004 | Ludwig et al. |
| 8,703,879 B2 | 4/2014 | Loth et al. |
| 2012/0065339 A1* | 3/2012 | Grutzner ................ C08G 69/48 525/420 |
| 2013/0052444 A1 | 2/2013 | Scherzer et al. |
| 2014/0066588 A1 | 3/2014 | Stammer et al. |
| 2014/0256887 A1 | 9/2014 | Kory et al. |

FOREIGN PATENT DOCUMENTS

| DE | 1142696 B | 1/1963 |
| DE | 2501348 A1 | 7/1976 |
| DE | 2732328 A1 | 2/1979 |
| DE | 248131 A1 | 7/1987 |
| DE | 274823 A1 | 1/1990 |
| EP | 0284986 A2 | 10/1988 |
| EP | 732 351 A2 | 9/1996 |
| EP | 1 235 671 A1 | 9/2002 |
| GB | 1305246 A | 1/1973 |
| KR | 20020041589 A | 6/2002 |
| WO | WO-99/26996 A2 | 6/1999 |
| WO | WO-0139947 A1 | 6/2001 |
| WO | WO-2009153340 A1 | 12/2009 |
| WO | WO-2012031950 A1 | 3/2012 |
| WO | WO-2014135625 A1 | 9/2014 |

OTHER PUBLICATIONS

International Preliminary Report on Patentability for PCT/EP2014/058797 dated Nov. 3, 2015 and the Translation.
International Search Report for PCT/EP2014/058797 mailed Jul. 10, 2014.

* cited by examiner

*Primary Examiner* — Ana Woodward
(74) *Attorney, Agent, or Firm* — Drinker Biddle Reath LLP

(57) ABSTRACT

The invention relates to a method for synthesizing a polyamide, in which method an aqueous solution is sprayed onto the polyamide before and/or during a solid-state post-condensation process. The aqueous solution comprises at least a first compound, selected from the group comprising phosphoric acid, fully neutralized salts of phosphoric acid, partially neutralized salts of phosphoric acid, and mixtures thereof, and a second compound, selected from the group comprising an acid, an anhydride, a lactone, ammonia, an amine, and mixtures thereof, with the stipulation that the second compound is not phosphoric acid and is not phosphoric acid anhydride. The spraying occurs at a temperature that lies below the boiling point of water. A polyamide that can be produced by means of the method according to the invention can be used in particular to produce films, monofilaments, fibers, threads, or textile sheet materials.

20 Claims, No Drawings

METHOD FOR PRODUCING HIGHLY VISCOUS POLYAMIDES

CROSS-REFERENCE TO RELATED APPLICATIONS

This application is a national stage application (under 35 U.S.C. §371) of PCT/EP2014/058797, filed Apr. 30, 2014, which claims benefit of European Application No. 13166227.2, filed May 2, 2013, both of which are incorporated herein by reference in their entirety.

BACKGROUND OF THE INVENTION

The present invention relates to a process for synthesis of a high-viscosity polyamide, to a polyamide producible thereby and to the use thereof.

STATE OF THE ART

Polyamides are one of the polymers produced on a large scale globally and, in addition to the main fields of use in films, fibers and materials, serve for a multitude of further end uses. Among the polyamides, nylon-6 (polycaprolactam) with a proportion of about 57% is the most commonly produced polymer. The conventional process for producing nylon-6 is the hydrolytic polymerization of ε-caprolactam, which is still of very great industrial significance. In this way, it is possible to produce further important polyamides by ring-opening polymerization. Conventional hydrolytic production processes are described, for example, in Ullmann's Encyclopedia of Industrial Chemistry, Online edition 03.15.2003, vol. 28, p. 552-553 and Kunststoffhandbuch, ¾ Technische Thermoplaste: Polyamide [Plastics Handbook, ¾ Industrial Thermoplastics: Polyamides], Carl Hanser Verlag, 1998, Munich, p. 42-47 and 65-70.

A further important process which is used, for example, for preparation of aliphatic and semiaromatic polyamides commences with the formation of an aqueous salt solution from at least one diamine and at least one dicarboxylic acid and optionally further monomer components such as lactams, ω-amino acids, monoamines, monocarboxylic acids, etc. The formation of the salt solution is then followed by an oligomerization in the liquid aqueous phase. For the desired increase in molecular weight, in the continuation of the process, the reaction temperature is increased and water is removed.

For many applications, for example the production of flexible films for packaging, polyamides with relatively high molecular weights are required, and these are not attained by the hydrolytic polymerization alone. It is known that the molecular weight or the viscosity of the polyamide can be increased by performing a postcondensation after the first polymerization and generally a workup of the prepolymer thus obtained by extraction and drying. In this case, the polyamide is preferably in the solid phase (solid phase postpolymerization, solid phase condensation). For this purpose, polyamide pellets can be heat treated at temperatures below the melting point of the polyamide, with advancing polycondensation in particular. This leads to an increase in the molecular weight and hence to an increase in the viscosity number of the polyamide. There is a need for processing-stable polyamides, i.e. for polyamides which, during melt processing, for example to form films, monofilaments, fibers or other products, feature a reduced decrease in viscosity and a lesser tendency to depolymerize and specifically to release monomers, for example ε-caprolactam. Thus, the polyamides, specifically in the course of film production, are exposed to aggressive processing conditions.

Films for flexible packaging formed from polyamides, such as nylon-6 and nylon-6,66, can be produced by melt extrusion both as flat films (via a slot die) or as blown films (via ring dies), with high shear forces acting on the polyamide melt depending on the plant size and the throughput. The polyamides used with preference have a high viscosity (relative viscosity RV in 96% sulfuric acid from about 3.3 to 5.0) and are sensitive to a decrease in molecular weight. One reason for this may be that monomer and polymer are in a chemical equilibrium and hence the reverse reaction to the polymerization also proceeds under the processing conditions, and another may be thermal degradation. In both cases, monomers are formed, specifically ε-caprolactam, which either escape in gaseous form into the environment or precipitate as deposits on cooled parts of the plant. In spite of highly developed suction systems, especially in flat film plants, there are die or chill-roll deposits which cause contamination on the film produced after a certain service life and necessitate cleaning stoppages. These cleaning stoppages interrupt film production and lead to an unsatisfactory yield of finished product. Thermal degradation of high-viscosity polyamides additionally leads to a reduction in the average chain lengths. As already explained, this process is intensified under more aggressive processing conditions, for example higher processing temperatures, and thus limits the throughput of plants for production of films.

For production of high-viscosity polyamides having stable melt viscosity, various processes have been proposed. For instance, solid phase postcondensation can be considerably accelerated by additions of particular phosphoric acids or salts thereof. A disadvantage of this process is that the polymerization reaction also continues in downstream processing steps, for example in extrusion.

DE 1 142 696 A1 discloses that the combination of phosphorus compounds with alkanecarboxylic acids, alkanedicarboxylic acids or salts thereof can advantageously stabilize the melt viscosity of polyamides when they are mixed with the polyamides by means of kneaders or screw machines. However, these kneaders or screw machines cause high costs in the polyamide synthesis.

KR 2002-0041589A states that dicarboxylic acids and phosphorus compounds increase the thermal stability of polyamides when they are added to the monomers or to the prepolymer. However, this leads to salt deposits in the downstream extraction.

DD 274 823 A1 discloses a process for producing high-viscosity polyamides by postpolycondensation of low- or medium-viscosity polyamides with a steam/catalyst mixture. The catalyst used is phosphoric acid or salts thereof. For example, the treatment of nylon-6 pellets with phosphoric acid or sodium dihydrogenphosphate in a steam atmosphere is described. This process, however, entails a batchwise mode of operation in a separate tumble drier and an extension of the residence time of the pellets by a 30-minute treatment in the steam atmosphere. It is additionally stated that the addition of an aqueous phosphoric acid solution in a tumble drier at room temperature leads to a product having inhomogeneous solution viscosity. A film produced from this product has many specks.

WO 2012/031950 A1 describes a process for producing processing-stable polyamides, in which a polyamide is treated during the solid phase postcondensation with a gas comprising a carrier gas, water, a first component a) selected from acids, anhydrides and lactones, and a second component b) selected from ammonia and amines. Specifically, there is a description of nebulization of the additives in a carrier gas stream and passage of the laden gas stream through a polyamide bed. This process enables the production of polyamides which, even under comparatively aggressive processing conditions, feature a reduced decrease in viscosity and a lesser degree of reformation and release of the monomers. However, it is still in need of improvement since liquid droplets are rapidly deposited on the pellets through which the gas flows. In the case of plants on the production scale, the additive is therefore not distributed homogeneously in the bed of pellets.

U.S. Pat. No. 5,234,644 describes a process for preparing polyamide which firstly has a high molecular weight and secondly is uncrosslinked. In this process, the polyamide, prior to the solid phase postcondensation, is impregnated with a catalyst, an inorganic phosphorus compound. Aside from the inorganic phosphorus compounds, no compounds which make any contribution to stabilization of the molecular weight of the polyamide are used.

It is an object of the present invention to provide an improved process for production of polyamides, in which the aforementioned disadvantages are avoided. More particularly, it is to be possible by this process to provide a processing-stable polyamide. This is preferably to feature a high viscosity and a low residual monomer content. Under aggressive processing conditions, as, for example, in the case of film extrusion, there should neither be any great increase in viscosity as a result of the additives added nor any great decrease in viscosity. The release of monomers in the course of processing is to be avoided or at least reduced.

It has now been found that, surprisingly, this object is achieved when a polyamide prepolymer is subjected to a solid phase postcondensation and the polyamide prepolymer is contacted before and/or during the solid phase postcondensation with a composition comprising phosphoric acid or a salt thereof as a first component and a capping agent as a second component.

SUMMARY OF THE INVENTION

The invention therefore relates to a process for preparing polyamides, comprising a solid phase postpolymerization of a polyamide prepolymer, wherein the polyamide prepolymer is contacted prior to and/or during the solid phase postpolymerization with an aqueous composition comprising at least the following components:
A) at least one first compound selected from phosphoric acid, fully neutralized salts of phosphoric acid, partly neutralized salts of phosphoric acid and mixtures thereof, and
B) at least one second compound other than A), selected from acids, anhydrides, lactones, ammonia, amines and mixtures thereof, with the proviso that the second compound is not a phosphoric anhydride,
and wherein the polyamide prepolymer is contacted with the aqueous composition at a temperature and a pressure at which the aqueous composition is liquid.

A preferred embodiment is a process in which the polyamide prepolymer is prepared by
a) providing an aqueous composition comprising at least one component which is suitable for polyamide formation and is selected from salts of at least one dicarboxylic acid and at least one diamine, lactams, ω-amino acids, aminocarbonitriles and mixtures thereof,
b) converting the composition provided in step a) in a polymerization at elevated temperature in the presence of water to obtain a polyamide prepolymer,
c) subjecting the polyamide prepolymer obtained in step b) to a shaping operation to obtain polyamide particles,
d) optionally subjecting the polyamide particles obtained in step c) to a workup,
e) using the polyamide particles obtained in step c) or in step d) for solid phase postpolymerization.

In a preferred embodiment, the aqueous composition is sprayed onto the polyamide prepolymer. In this embodiment, the spray application of the aqueous composition is especially effected continuously.

The invention further provides a polyamide composition obtainable by the process described above and hereinafter. This polyamide composition features the specific additization of the polyamides present with at least one first compound A) and at least one second compound B). It has excellent processing stability. The term "additization" is understood here in a broad sense. For instance, the inventive polyamide composition may comprise components A) and/or B) in unaltered form, or else in the form of reaction products formed in the solid phase postpolymerization.

The invention further provides for the use of a polyamide composition obtainable by the process described above and hereinafter, especially for production of films, monofilaments, fibers, yarns or textile fabrics.

DETAILED DESCRIPTION OF THE INVENTION

A "solid phase postpolymerization" is generally understood to mean a condensation reaction to increase the molecular weight within a temperature range above the glass transition temperature and below the melting temperature of the polyamide. Within this temperature range, unwanted thermal degradation of the polyamide can substantially be avoided.

A prepolymer in the context of the invention refers to a composition comprising polymeric compounds having complementary functional groups capable of a condensation reaction with an increase in molecular weight.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N-(CH_2)_x-COOH$ type or the corresponding lactams are identified as PA Z where Z denotes the number of carbon atoms in the monomer. For example, PA 6 represents the polymer of ε-caprolactam or of ω-aminocaproic acid. Polyamides which derive from diamines and dicarboxylic acids of the $H_2N-(CH_2)_x-NH_2$ and $HOOC-(CH_2)_y-COOH$ types are identified as PA Z1Z2 where Z1 denotes the number of carbon atoms in the diamine and Z2 the number of carbon atoms in the dicarboxylic acid. Copolyamides are designated by forming the possible homopolyamide combinations from the available monomers and then concatenating them. For example, PA 66/610 is the copolyamide of hexamethylenediamine, adipic acid and sebacic acid. For the monomers having an aromatic or cycloaliphatic group which are used in accordance with the invention, the following letter abbreviations are used:

T=terephthalic acid, I=isophthalic acid, MXDA=m-xylylenediamine, IPDA=isophoronediamine,

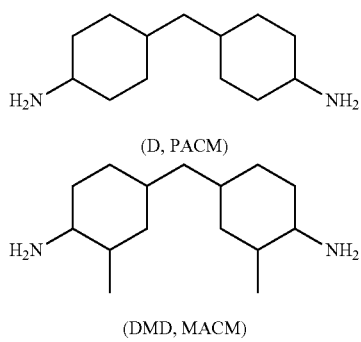

(D, PACM)

(DMD, MACM)

Hereinafter, the expression "$C_1$-$C_{20}$-alkyl" comprises unsubstituted straight-chain and branched $C_1$-$C_{20}$-alkyl groups. It preferably comprises straight-chain or branched $C_1$-$C_{10}$-alkyl groups, more preferably $C_1$-$C_8$-alkyl groups and most preferably $C_1$-$C_6$-alkyl groups. Examples of $C_1$-$C_{10}$-alkyl groups are especially methyl, ethyl, propyl, isopropyl, n-butyl, isobutyl, sec-butyl, tert-butyl(1,1-dimethylethyl), n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethyl-butyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propyl-butyl, n-octyl, 2-ethylhexyl, 2-propylheptyl, nonyl, decyl, undecyl, dodecyl, etc.

The expression "$C_2$-$C_{10}$-alkylene" in the context of the present invention represents straight-chain or branched alkanediyl groups having preferably 1 to 6 carbon atoms. These include methylene (—CH$_2$—), ethylene (—CH$_2$—CH$_2$—), n-propylene (—CH$_2$—CH$_2$—CH$_2$—), isopropylene (—CH$_2$—CH(CH$_3$)—), etc. Analogously, the expression "$C_2$-$C_6$-alkenylene" represents straight-chain or branched alkenediyl groups having 1 to 6 carbon atoms and one double bond. The expression "$C_2$-$C_6$-alkynylene" represents straight-chain or branched alkynediyl groups having 1 to 6 carbon atoms and one triple bond.

The expression "$C_3$-$C_8$-cycloalkyl" in the context of the present invention comprises mono-, bi- or tricyclic hydrocarbyl radicals. These include cyclopropyl, cyclobutyl, cyclopentyl, cyclohexyl, cycloheptyl, cyclooctyl, cyclododecyl, cyclopentadecyl, norbornyl or adamantyl.

The expression "aryl" in the context of the present invention comprises mono- or polycyclic aromatic hydrocarbyl radicals. These have preferably 6 to 20 ring atoms, more preferably 6 to 14 ring atoms and especially 6 to 10 ring atoms. Aryl is more preferably phenyl, naphthyl, indenyl, fluorenyl, anthracenyl, phenanthrenyl, naphthacenyl, chrysenyl, pyrenyl, coronenyl, perylenyl, etc. More particularly, aryl is phenyl or naphthyl.

The expression "$C_7$-$C_{20}$-arylalkyl" denotes aryl-substituted alkyl radicals. Aryl is preferably as defined above. Aryl is preferably phenyl or naphthyl. The alkyl group is preferably a $C_1$-$C_4$-alkyl as defined above. Examples of $C_7$-$C_{20}$-arylalkyl are benzyl, 1-naphthylmethyl, 2-naphthylmethyl, diphenylmethyl, 1-phenylethyl, 2-phenylethyl, 1-phenylpropyl, 2-phenylpropyl, 3-phenylpropyl, 1-methyl-1-phenylethyl, 4-phenylbutyl, 2,2-dimethyl-2-phenylethyl, especially benzyl.

The expression "$C_8$-$C_{20}$-alkylarylalkyl" denotes aryl-substituted alkyl radicals, where the alkyl group is itself substituted by alkyl. Suitable aryl-substituted alkyl radicals are the aforementioned $C_7$-$C_{20}$-arylalkyls. The alkyl radicals on the aryl are preferably selected from $C_1$-$C_4$-alkyl as defined above. Examples of $C_8$-$C_{20}$-alkylarylalkyl are 2-methylbenzyl and 2-methylphenylethyl.

The polyamides produced in accordance with the invention feature a high viscosity. The viscosity of polyamides can be reported, for example, as the viscosity number or as the relative viscosity.

The viscosity number (Staudinger function, referred to as VN or J) is defined as $VN=1/c \times (\eta - \eta_s)/\eta_s$. The viscosity number is directly related to the mean molar mass of the polyamide and gives information about the processability of a polymer. The viscosity number can be determined to EN ISO 307 with an Ubbelohde viscometer.

The relative viscosity (RV) in the context of this invention is determined at 25° C. as a solution in 96% by weight $H_2SO_4$ with a concentration of 1.0 g of polyamide in 100 ml of sulfuric acid. The determination of the relative viscosity follows EN ISO 307.

The polyamides produced in accordance with the invention preferably have a viscosity number of 195 to 321 ml/g, more preferably of 218 to 248 ml/g.

The relative viscosity of the polyamides produced in accordance with the invention is preferably 33 to 50, more preferably 36 to 40.

The first component A) used in accordance with the invention is capable of functioning as a polymerization catalyst in the postcondensation of the polyamide.

The second component B) used in accordance with the invention is capable of functioning as a capping agent (blocking agent, end-capper). A capping agent in the context of the invention is understood to mean a compound having at least one reactive group capable of entering into a reaction, under the conditions of the solid phase polymerization, with a complementary reactive group in the polyamide prepolymer. For example, a component B having carboxylic acid groups or anhydrides may react with an amino end group of the prepolymer to form an amide.

Preferably, component B is used in such an amount that not all reactive groups in the prepolymer that are capable of reaction with components B are converted.

The amount of component B is preferably chosen such that the reactive groups of the prepolymer, i.e. the sum total of the amino end groups (AEG) and the carboxyl end groups (CEG), are not fully capped.

The molar ratio of component B to the reactive groups of the prepolymer, i.e. the sum total of the amino end groups (AEG) and the carboxyl end groups (CEG), is preferably 1:50 to 1:5, more preferably 1:30 to 1:6, especially 1:15 to 1:7.

In a first preferred embodiment, component B is selected from acids, anhydrides and lactones.

The molar ratio of component B, selected from acids, anhydrides and lactones, to the amino end groups (AEG) of the prepolymer is preferably 1:50 to 1:5, more preferably 1:30 to 1:6, especially 1:15 to 1:7.

In a second preferred embodiment, component B is selected from amines and ammonia.

The molar ratio of component B, selected from amines and ammonia, to the carboxyl end groups (CEG) of the prepolymer is preferably 1:50 to 1:5, more preferably 1:30 to 1:6, especially 1:15 to 1:7.

Through the use of acid, anhydride or lactone or mixtures thereof as component B), it is possible to achieve a decrease in the amino end groups (AEG) of the polyamide obtained.

Through the use of ammonia or amine or mixtures thereof as component B), it is possible to achieve a decrease in the carboxyl end groups (CEG).

The polyamide obtained by the process according to the invention preferably has a concentration of amine end groups (AEG) of less than or equal to 30 meq/kg of polymer, more preferably of less than or equal to 20 meq/kg of polymer.

The polyamide obtained by the process according to the invention preferably has a concentration of carboxyl end groups (CEG) of less than or equal to 60 meq/kg of polymer, more preferably of less than or equal to 40 meq/kg of polymer.

In a preferred embodiment, the polyamide prepolymer is contacted with the aqueous composition at a temperature and a pressure at which the aqueous composition is liquid. The contacting is thus preferably effected at a temperature below the boiling temperature of water under the treatment conditions. When the contacting is effected at standard pressure, the temperature is thus below 100° C. If the contacting is effected at a higher or lower pressure, it is correspondingly effected at a lower or higher maximum temperature. The subsequent postpolymerization can then be effected under different pressure and/or temperature conditions. In the postpolymerization, the temperature in the reaction zone is preferably within a range from 120 to 185° C., more preferably from 130 to 180° C. In the postpolymerization, the pressure in the reaction zone is typically within a range from 1 mbar to 1.5 bar, more preferably 500 mbar to 1.3 bar.

The polyamide is preferably selected from PA 6, PA 11, PA 12, PA 46, PA 66, PA 666, PA 69, PA 610, PA 612, PA 96, PA 99, PA 910, PA 912, PA 1212, PA 6T, PA 9T, PA 10T, PA 12T, PA 6I, PA 9I, PA 10I, PA 12I, PA 6T 6I, PA MXD6, PA MACM I, PA MACM T, PA PACM I, PA PACM T and copolymers and mixtures thereof.

The polyamide is more preferably selected from PA 6, PA 66, PA 666, PA 69, PA 610, PA 6T, PA 6I16T, PA 612, PA 11, PA 12, PA 46, PA MXD6 and copolymers and mixtures thereof.

The polyamide is especially PA 6, PA 66 or PA 666, most preferably PA 6.

Preferably, component B) comprises at least one acid selected from monocarboxylic acids $R^1$—COOH, dicarboxylic acids $R^2$—(COOH)$_2$ and mixtures thereof, in which $R^1$ is hydrogen, $C_1$-$C_{10}$-alkyl or phenyl and $R^2$ is a chemical bond, $C_1$-$C_{10}$-alkylene or phenylene.

Suitable acids B) are especially short- and long-chain and branched aliphatic or aromatic monocarboxylic acids. $R^1$ is preferably hydrogen, phenyl or $C_1$-$C_8$-alkyl. $R^1$ is more preferably $C_1$-$C_4$-alkyl, such as methyl, ethyl, n-propyl, isopropyl, n-butyl, isobutyl, sec-butyl or tert-butyl. $R^1$ is especially ethyl or n-propyl. $R^2$ is preferably $C_1$-$C_9$-alkylene, more preferably $C_1$-$C_7$-alkylene, especially $C_1$-$C_3$-alkylene such as methylene, ethylene, n-propylene, isopropylene, n-butylene, isobutylene, sec-butylene or tert-butylene. Most preferably, $R^2$ is ethylene or n-propylene.

The acid B) is preferably selected from formic acid, acetic acid, propionic acid, benzoic acid, pivalic acid, succinic acid and mixtures thereof. The acid B) is more preferably selected from acetic acid, propionic acid or succinic acid. More preferably, the acid B) is succinic acid.

Suitable acids B) are additionally especially phosphonic acid, phosphinic acid and phosphonates, i.e. phosphonic acid-comprising organophosphorus compounds such as 2-aminoethylphosphonic acid (AEPN), 1-hydroxyethylidene-1,1-diphosphonic acid (HEDP), aminotris(methylenephosphonic acid) (ATMP), ethylenediamine-tetra(methylenephosphonic acid) (EDTMP), tetramethylenediaminetetra(methylenephosphonic acid) (TDTMP), hexamethylenediaminetetra(methylenephosphonic acid) (HDTMP), diethylenetriaminepenta(methylenephosphonic acid) (DTPMP) and 2-carboxylethylphosphonic acid (CEPA). Preference is given to phosphonic acid and diethylenetriaminepenta(methylenephosphonic acid) (DTPMP).

Additionally preferably, component B) comprises at least one anhydride selected from
aliphatic anhydrides $R^3$—C(=O)—O—C(=O)—$R^4$, in which $R^3$ and $R^4$ are each independently $C_1$-$C_{10}$-alkyl
alicyclic or aromatic anhydrides of the formula

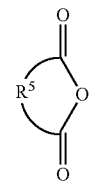

in which $R^6$ is $C_2$-$C_6$-alkylene, $C_2$-$C_6$-alkenylene, $C_2$-$C_6$-alkynylene or a divalent saturated or mono- or poly-unsaturated or aromatic cyclic radical, and
mixtures thereof, Preferably, $R^3$ and $R^4$ are each independently selected from $C_1$-$C_{10}$-alkyl, more preferably $C_1$-$C_8$-alkyl, especially $C_1$-$C_4$-alkyl, such as methyl, ethyl, n-propyl, isopropyl, n-butyl, isobutyl, sec-butyl or tert-butyl, most preferably methyl or ethyl.

$R^6$ is preferably an alkylene having 2 to 6 carbon atoms, preferably 2 to 4 carbon atoms and more preferably 2 to 3 carbon atoms, or an alkenylene having 2 to 6 carbon atoms, preferably 2 to 4 carbon atoms and more preferably 2 carbon atoms, or an alkynylene having 2 to 6 carbon atoms, preferably 2 to 4 carbon atoms and more preferably 2 carbon atoms. The anhydride is preferably selected from acetic anhydride, succinic anhydride, glutaric anhydride, maleic anhydride and phthalic anhydride. Particular preference is given to succinic anhydride, glutaric anhydride or maleic anhydride, very particular preference to succinic anhydride or glutaric anhydride.

Suitable lactones B) are especially γ-lactones, δ-lactones, ε-lactones and mixtures thereof. Preference is given to butyrolactone, valerolactone and caprolactone, particular preference to butyrolactone and caprolactone, and very particular preference to caprolactone.

Suitable amines B) are especially primary amines $R^6$—$NH_2$, secondary amines $R^6R^7$—$NH_2$, tertiary amines $R^6R^7R^8$—N, quaternary amines $R^6R^7R^8R^9$—$N^+(X^-)$ and diamines $(H_2N)$—$R^{10}$—$(NH_2)$. In these formulae, $R^6$, $R^7$, $R^8$, $R^9$ are each independently $C_1$-$C_{20}$-alkyl, preferably $C_1$-$C_{10}$-alkyl, more preferably $C_1$-$C_6$-alkyl such as methyl, ethyl, n-propyl and isopropyl, $C_3$-$C_8$-cycloalkyl such as cyclopropyl, cyclobutyl, cyclopentyl, cyclohexyl, cycloheptyl and cyclooctyl, more preferably cyclopentyl, cyclohexyl, cycloheptyl and cyclooctyl, aryl such as phenyl, 1-naphthyl and 2-naphthyl, $C_7$-$C_{20}$-alkylaryl, preferably $C_7$-$C_{12}$-alkylphenyl such as benzyl and phenylethyl, $C_8$-$C_{20}$-alkylarylalkyl, preferably $C_7$-$C_{16}$-alkylphenylalkyl such as 2-methylbenzyl and 2-methylphenylethyl, more preferably $C_7$-$C_{12}$-alkylphenylalkyl such as 2-methylbenzyl, $R^{10}$ is $C_2$-$C_{20}$-alkylene, preferably $C_2$-$C_8$-alkylene, more preferably $C_2$-$C_6$-alkylene, most preferably n-propylene, isopropylene, n-butylene, isobutylene or tert-butylene.

$X^-$ represents one anion equivalent. Preferably, $X^-$ is halogen, preferably fluoride, chloride, bromide or iodide, more preferably chloride or bromide, and most preferably chlorine. The amines are preferably $C_1$-$C_{20}$-amines, more preferably $C_1$-$C_8$-amines such as methylamine, dimethylamine, ethylamine, n-propylamine, 2-propylamine, n-butylamine, prim-butylamine, sec-butylamine, tert-butylamine, n-pentylamine, 2-pentylamine, 3-pentylamine, n-hexylamine, 2-hexylamine, 3-hexylamine, n-heptylamine, 2-heptylamine, 3-heptylamine, 4-heptylamine, n-octylamine, 2-octylamine, 3-octylamine, cyclopropylamine, cyclobutylamine, cyclopentylamine, cyclohexylamine, cycloheptylamine, cyclooctylamine, 1,1,3,3-tetramethylbutylamine, N-ethylmethyl-amine, dimethylamine, diethylamine, di-n-propylamine, diisopropylamine, din-butylamine, di-sec-butylamine, di-n-pentylamine, N-methylpropylamine, N-ethylpropylamine, 1,2-diaminopropane, 1,3-diaminopropane, 1,2-diaminobutane, 1,3-diaminobutane and 1,4-diaminobutane, more preferably methylamine, dimethylamine and cyclohexylamine.

The aqueous solution comprises preferably 0.25% by weight to 1% by weight of phosphorus in the first compound. In addition, the aqueous solution preferably comprises 0.25% by weight to 1% by weight of the second compound.

The spray application of the aqueous solution is especially effected continuously. In addition, it is preferable that the aqueous solution is sprayed onto the polyamide within a period of not more than 30 seconds, preferably of not more than 10 seconds.

Preferably, the aqueous solution is distributed mechanically on the surface of the polyamide. Particular preference is given to mechanical distribution by means of mixing and dispersing elements, for example paddles, spirals, disks, hooks. Preference is given to using a paddle mixer.

Production Processes

The provision of the polyamide is effected preferably by a process comprising steps a) to e), as described above.

Step a)

In step a), an aqueous composition comprising at least one component which is suitable for polyamide formation and is selected from salts of at least one dicarboxylic acid and at least one diamine, lactams, ω-amino acids, aminocarbonitriles and mixtures thereof is provided. The aqueous composition used to produce the polyamides may additionally comprise at least one comonomer suitable for polyamide formation, preferably selected from ω-aminocarboxamides, ω-aminocarboxylic esters, dinitriles and mixtures thereof.

The monomer mixture provided in step a) comprises preferably at least one $C_5$-$C_{12}$-lactam and/or an oligomer thereof. The lecterns are especially selected from ε-caprolactam, 2-piperidone (δ-valerolactam), 2-pyrrolidone (γ-butyrolactam), capryllactam, enanthlactam, lauryllactam, and mixtures and oligomers thereof. Particular preference is given to providing, in step a), a monomer mixture comprising ε-caprolactam. More particularly, in step a), a monomer mixture comprising exclusively ε-caprolactam as a monomer component is provided.

In addition, it is also possible that in step a), a monomer mixture comprising, in addition to at least one lactam, at least one monomer (M) copolymerizable therewith is provided.

Suitable monomers (M) are dicarboxylic acids, for example aliphatic $C_{4-10}$-alpha, omega-dicarboxylic acids, such as succinic acid, glutaric acid, adipic acid, pimelic acid, suberic acid, azelaic acid, sebacic acid and dodecanedioic acid. It is also possible to use aromatic $C_{8-20}$-dicarboxylic acids such as terephthalic acid and isophthalic acid.

Diamines suitable as monomers (M) may be α,ω-diamines having four to ten carbon atoms such as tetramethylenediamine, pentamethylenediamine, hexamethylenediamine, heptamethylenediamine, octamethylenediamine, nonamethylenediamine and decamethylenediamine. Particular preference is given to hexamethylenediamine.

Among the salts of said dicarboxylic acids and diamines which are suitable as monomers (M), preference is given especially to the salt of adipic acid and hexamethylenediamine, called AH salt.

Suitable monomers (M) are also lactones. Preferred lactones are, for example, Σ-caprolactone and/or γ-butyrolactone.

In the preparation of the polyamides, it is possible to use one or more chain regulators, for example aliphatic amines or diamines, such as triacetonediamine, or mono- or dicarboxylic acid such as propionic acid and acetic acid, or aromatic carboxylic acids such as benzoic acid or terephthalic acid.

The polyamides produced in the process according to the invention may additionally comprise customary additives such as matting agents, e.g. titanium dioxide, nucleators, e.g. magnesium silicate, stabilizers, e.g. copper(I) halides and alkali metal halides, antioxidants, reinforcers etc, in customary amounts. The additives are generally added before, during or after the hydrolytic polymerization (step b). Preferably, the additives are added before the hydrolytic polymerization in step b).

Step b)

The conversion of the composition provided in step a) in step b) can be effected by standard processes known to those skilled in the art. Processes of this type, for example for melt polymerization, are described, for example, in Kunststoff Handbuch, ¾ Technische Thermoplaste: Polyamide, Carl Hanser Verlag, 1998, Munich. This disclosure is fully incorporated here by reference.

In a specific embodiment, in step b), a lactam-containing composition is converted in a hydrolytic polymerization. Such a process is described, for example, in Kunststoff Handbuch, ¾ Technische Thermoplaste: Polyamide, Carl Hanser Verlag, 1998, Munich, p. 42-47 and 65-70.

Preferably, in step b), hydrolytic polymerization is accomplished by subjecting a lactam to ring opening under the action of water. This involves, for example, at least partly cleaving the lactam to give the corresponding aminocarboxylic acid, which is then polymerized further in the subsequent step by polyaddition and polycondensation. If, in a preferred embodiment, in step a), a monomer mixture comprising caprolactam is provided, the latter is at least partly opened under the action of water to give the corresponding aminocaproic acid and then reacts with polycondensation and polyaddition to give nylon-6.

In a specific version, the monomer mixture provided in step a) consists of at least one lactam and the hydrolytic polymerization in step b) is effected in the presence of 0.1 to 4% by weight of water, based on the total amount of the lactam used. The lactam is specifically ε-caprolactam.

The conversion in step b) is preferably effected continuously.

Suitable reactors are the reactors which are known to those skilled in the art and are customary for preparation of polyamides. Preferably, the hydrolytic polymerization in step b) is effected in a polymerization tube or a bundle of polymerization tubes. Specifically, for the hydrolytic polymerization in step b), at least one VK tube is used, this being a vertical tubular reactor. This German abbreviation "VK" stands for "vereinfacht kontinuierlich" ["simplified continuous"].

The hydrolytic polymerization in step b) can be effected in one or more stages (for example two stages). In a multistage version of the conversion in step b), preferably at least one of the stages is effected in a VK tube. In a two-stage version of the conversion in step b), the second stage is preferably effected in a VK tube. In a two-stage version of the conversion in step b), the first stage can preferably be effected in a preliminary pressure reactor.

The hydrolytic polymerization in step b) is preferably effected at a temperature in the range from 240 to 280° C. In a multistage version of the hydrolytic polymerization in step b), the individual stages can be effected at the same or at different temperatures and pressures. In the case of performance of a polymerization stage in a tubular reactor, specifically a VK tube, the reactor may have essentially the same temperature over the entire length. Another possibility is a temperature gradient in the region of at least part of the tubular reactor. Another possibility is the performance of the hydrolytic polymerization in a tubular reactor having two or more than two reaction zones which are operated at different temperature and/or at different pressure. The person skilled in the art can select the optimal conditions as required, for example taking account of the equilibrium conditions.

When the hydrolytic polymerization in step b) is effected in one stage, the absolute pressure in the polymerization reactor is preferably within a range from about 1 to 10 bar, more preferably from 1.01 bar to 2 bar. Particular preference is given to performing the one-stage polymerization at ambient pressure.

In a preferred version, the hydrolytic polymerization in step b) is performed in two stages. The upstream connection of a pressure stage makes it possible to achieve a process acceleration, by performing the rate-determining cleavage of the lactam, specifically of caprolactam, under elevated pressure under otherwise similar conditions to those in the second reaction stage. The second stage is then preferably effected in a VK tube as described above. The absolute pressure in the first stage is preferably within a range from about 1.5 to 70 bar, more preferably within a range from 2 to 30 bar. The absolute pressure in the second stage is preferably within a range from about 0.1 to 10 bar, more preferably from 0.5 bar up to 5 bar. More particularly, the pressure in the second stage is ambient pressure.

Step c)

In step c) of the process according to the invention, the polyamide prepolymer obtained in step b) is subjected to a shaping operation to obtain polyamide particles.

Preferably, the polyamide prepolymer obtained in step b) is first shaped to one or more strands. For this purpose, apparatuses known to those skilled in the art can be used.

Suitable apparatuses are, for example, perforated plates, nozzles or die plates. Preferably, the reaction product obtained in step b) is shaped to strands in the free-flowing state and subjected in the form of strands of free-flowing reaction product to a comminution to give polyamide particles. The hole diameter is preferably within a range from 0.5 mm to 20 mm, more preferably 1 mm to 5 mm, most preferably 1.5 to 3 mm.

Preferably, the shaping in step c) comprises a pelletization. For pelletization, the polyamide prepolymer obtained in step b), having been shaped to one or more strands, can be solidified and then pelletized. For example, Kunststoffhandbuch, ¾ Technische Thermoplaste: Polyamide, Carl Hanser Verlag, 1998, Munich, p. 68-69 describes suitable measures. A specific shaping process is underwater pelletization, which is likewise known in principle to those skilled in the art.

Step d)

For many end uses, for example for production of films for packaging materials, a relatively low residual monomer content in the polyamide is required. In a specific embodiment of the process according to the invention, the polyamide prepolymer obtained in step c), prior to further processing thereof, is generally subjected to an at least partial removal of monomers and/or oligomers.

The workup in step d) preferably comprises an extraction and/or a drying operation.

To reduce the content of low molecular weight components, the pellets of crude polyamide particles obtained in step c) can be extracted with an extractant in order to at least partly remove monomers and oligomers present. This is frequently effected by continuous or batchwise extraction with hot water, as described, for example, in DE 25 01 348 A and DE 27 32 328 A. For purification of crude nylon-6, extraction with caprolactam-containing water (WO 99/26996 A2) or treatment in a superheated water vapor stream (EP 0 284 986 A1) is also known. For environmental and economic reasons, the extracted constituents, more particularly the caprolactam and the cyclic oligomers in the case of nylon-6, are recycled into the process. The extraction is typically followed by drying of the extracted polyamide.

Suitable processes and apparatuses for extraction of polyamide particles are known in principle to those skilled in the art.

Preference is given to extraction in step d) using an extractant comprising water or consisting of water. In a preferred version, the extractant consists solely of water. In a further preferred version, the extractant comprises water and a lactam used for preparation of the polyamide and/or oligomers thereof. In the case of nylon-6, it is thus also possible to extract using caprolactam-containing water, as described in WO 99/26996 A2. For environmental and economic reasons, the extracted constituents, more particularly the caprolactam and the cyclic oligomers in the case of nylon-6, are recycled into the process.

The temperature of the extractant is preferably within a range from 75 to 130° C., more preferably from 85 to 120° C.

The extraction can be effected continuously or batchwise. Preference is given to a continuous extraction.

In the extraction, the polyamide particles and the first extractant can be conducted in cocurrent or in countercurrent. Preference is given to extraction in countercurrent.

The extraction is typically followed by drying of the extracted polyamide. The drying of polyamides is known in principle to those skilled in the art. For example, the extracted pellets can be dried by contacting with dry air or a dry inert gas or a mixture thereof. Preference is given to using an inert gas, e.g. nitrogen, for drying. The extracted pellets can also be dried by contacting with superheated water vapor or a mixture thereof with a different gas, preferably an inert gas. For drying, it is possible to use customary driers, for example countercurrent driers, crosscurrent driers, pan driers, tumble driers, paddle driers, counterflow tower driers, cone driers, tower driers, fluidized beds, etc. A specific version is continuous drying in tubular driers, through which a gas which is inert under the drying conditions flows. In a specific version, drying is accomplished using at least one tower drier.

The drying in step d) and the subsequent solid phase postpolymerization can also be combined in one step, in which case, for example, the drying operation can generally be effected in the upper third in a tube utilized for that purpose, and the postcondensation generally in the lower two thirds of the available tube length, with exclusion of atmospheric oxygen.

Step e

In the solid phase condensation, the polyamide is preferably in the form of pellets having a bulk density of 500 to 900 kg/m$^3$, preferably 600 to 800 kg/m$^3$, more preferably 700 to 800 kg/m$^3$. The mean diameter of the polyamide particles is preferably 1 to 4 mm, more preferably 1.5 to 3 mm.

In step e), the polyamide obtained in step c) or step d) is fed into a reaction zone for postpolymerization. This involves postpolymerizing the polyamide in the solid phase, meaning that the polyamide undergoes a heat treatment, the temperature being below the melting point of the polyamide.

Suitable reaction zones in which the postpolymerization takes place are in principle apparatuses as also usable for drying, for example countercurrent driers, crosscurrent driers, pan driers, tumble driers, paddle driers, counterflow tower driers, cone driers, tower driers, fluidized beds, etc. Preference is given to using, as the reaction zone in which the postpolymerization takes place, at least one reactor, more preferably at least one tubular reactor. In a specific version, postpolymerization is accomplished using at least one tower drier. Preferably, a hot gas which is inert under the postpolymerization conditions flows through the tower drier. A preferred inert gas is nitrogen.

Suitable processes for postpolymerization of hydrolytically prepared polyamides are known in principle to those skilled in the art. The postpolymerization can be performed, for example, as described in WO 2009153340, EP 1235671 or EP 0732351.

According to the invention, the aqueous solution comprising the first compound and the second compound is added before and/or during the solid phase postcondensation or in the combined drying/postcondensation tube.

The polyamide prepolymer can be contacted with the aqueous composition in the reaction zone used for solid phase postpolymerization and/or in a treatment zone upstream of the solid phase polymerization. The aqueous composition can be fed into the treatment zone and/or the reaction zone by means of customary apparatus. For delivery of the aqueous composition, it is possible, for example, to use a pump. Specifically, the aqueous composition is supplied via at least one nozzle. The aqueous composition can be metered in using a customary metering apparatus. Examples of these include metering pumps, metering valves, nozzles with a defined flow rate, etc. The aqueous composition can be fed into the treatment zone and/or the reaction zone via one or more feed points. In the treatment zone, the polyamide prepolymer is mixed with the aqueous composition. This can be done with the aid of a mechanical mixer, for example a paddle mixer. However, mixing without an active mixing unit is also possible, for example when the polyamide prepolymer is delivered by gravity to the next process section and is mixed by agitation in the process. Feeding into the reaction zone is also possible.

In the case of addition of the aqueous composition during the solid phase condensation too, contacting with the polyamide prepolymer can be effected within a comparatively short period, even though the solid phase postpolymerization generally takes much longer. The postpolymerization takes place, for example, continuously in towers over several hours. Here, the aqueous composition can be sprayed onto the pellets via one or more feed points. The water in the aqueous solutions vaporizes during the postpolymerization. Also possible are processes in which the postpolymerization is performed in batchwise mode, for example in tumble driers. Here, it would be possible to add components A and B as solutions at the start of postpolymerization and distribute them through the tumbling motion.

The postpolymerization can be effected in one stage (in a single reaction zone), It can also be effected in more than one stage, for example in two stages, in a plurality of reaction zones which may be arranged successively and/or in parallel. Preference is given to performing the postpolymerization in one stage.

In the postpolymerization, the temperature in the reaction zone is preferably within a range from 120 to 185° C., more preferably from 150 to 180° C.

In the postpolymerization, the pressure in the reaction zone is typically within a range from 1 mbar to 1.5 bar, more preferably from 500 mbar to 1.3 bar.

The temperature of the polyamide is controlled in the postpolymerization typically by means of heat exchangers, such as outer jackets, internal heat exchangers or other suitable devices. In a preferred embodiment, the postpolymerization in step e) is effected in the presence of at least one inert gas. In that case, the temperature of the polyamide can be controlled in the postpolymerization at least partly by the use of a hot inert gas. Preferably, hot inert gas flows through the reaction zone during the postpolymerization. Suitable inert gases are, for example, nitrogen, CD2, helium, neon and argon, and mixtures thereof. Preference is given to using nitrogen.

The residence time in the reaction zone in step e) is preferably 1 hour to 100 hours, more preferably 2 hours to 60 hours.

A high-viscosity polyamide produced in accordance with the invention is generally found to have particular processing stability during a melt extrusion through slot dies or ring-shaped dies to give flat films or blown films, and through ring-shaped dies of smaller diameter to give monofilaments.

In general, in the inventive synthesis of polyamides having a non-equimolar ratio of the end groups present (amino and carboxyl end groups), there is a reduction in the remonomerization rate in the course of extrusion or in the course of melting, and in the associated reduction in viscosity, especially of high-viscosity polyamide qualities, and in the content of regenerated monomers in the finished product such as films, monofilaments, fibers or carpets. The reduction in the amino end group number is additionally found to be advantageous for spun-dyed fibers, with a distinct decrease in the staining propensity, for example, of carpets produced therefrom.

The process according to the invention for treatment of the polyamides during the solid phase postcondensation generally has barely any or no adverse effects on the necessary residence time of the pellets in the postcondensation stage. In general, on the contrary, an acceleration is surprisingly actually observed.

The polyamide postcondensed in accordance with the invention can especially be used for production of films, monofilaments, fibers, yarns or textile fabrics. In this context, thermal degradation to give shortened polymer chains or lower viscosities can be reduced, the reformation of monomers can be decreased and, combined with this, the number of cleaning stoppages can be reduced and hence the yield improved.

The invention is now illustrated by working examples:

EXAMPLES

The solid phase polycondensation reactor consisted of a heated steel tube having a length of 1000 mm and a diameter of 100 mm. The nylon-6 pellets were introduced from the top via a lock and withdrawn at the bottom via a screw.

15 kg of pellets were mixed with 7 kg of a solution which comprised components A and B. After 60 minutes, the liquid was removed by means of a frit/suction flask.

The tube was filled with 5600 g of pellets and a nitrogen/steam mixture (490 l (STP)/h of nitrogen and 29.7 g/h of steam) at 170° C. flowed through it from the bottom. Every 2 h, 330 g of pellets were introduced via the lock and 300 g were removed via the screw. The pellets had been preheated beforehand in a drying cabinet at 110° C. for 2 h and heated in the lock at 160° C. for 2 h. The results are shown in table 1 below.

TABLE 1

| VN of the feedstock: 144 ml/g | | | |
| --- | --- | --- | --- |
| | $NaH_2PO_4$ [ppm P] | Succinic acid [ppm] | Monomer [%] | VN [ml/g] |
| CE1 | — | — | 0.17 | 205 |
| CE2 | 55 | — | 0.17 | 268 |
| CE3 | — | 330 | 0.19 | 213 |
| E1 | 80 | 330 | 0.15 | 253 |

Comparative example CE3 shows that the sole use of an end-capper without a phosphorus component leads to a significant decrease in the viscosity of the polyamide during the film extrusion.

A film was produced from the pellets obtained in a "Cast Film Line" (120 mm flat die) from OCS (Witten) at 270° C. The results are shown in table 2 below.

TABLE 2

| # | $NaH_2PO_4$ [ppm P] | Succinic acid [ppm] | Mw before film extrusion [g/mol] | Mw after film extrusion [g/mol] |
| --- | --- | --- | --- | --- |
| CE4 | — | — | 115000 | 116000 |
| CE5 | 50 | — | 114000 | 137000 |
| E2 | 110 | 330 | 118000 | 118000 |

Comparative examples CE2 and CE5 show that, in the case of use of a phosphorus component without an end-capper, the molecular weight and the viscosity of the polyamide rise significantly during the film extrusion, which necessitates individual adjustment of every film extruder to the product.

It can be inferred from inventive examples E1 and E2 that the polyamide produced in accordance with the invention is processing-stable, i.e. has robust behavior during the film extrusion, which is notable for a small decrease in viscosity and an unchanged molecular weight.

The invention claimed is:
1. A process for preparing polyamides, comprising:
1) preparing a polyamide prepolymer by
   a) providing an aqueous composition comprising at least one component which is suitable for polyamide formation and is selected from the group consisting of lactams, ω-amino acids, aminocarbonitriles, and salts of at least one dicarboxylic acid and at least one diamine,
   b) polymerizing the composition provided in step a) at elevated temperature in the presence of water to obtain a polyamide prepolymer,
   c) subjecting the polyamide prepolymer obtained in step b) to a shaping operation to obtain polyamide particles,
   d) optionally subjecting the polyamide particles obtained in step c) to an extraction and/or a drying step,
2) solid phase postpolymerizing the polyamide particles, wherein the polyamide particles are contacted immediately prior to and/or during the solid phase postpolymerization, but after step 1), with an aqueous composition comprising:
   A) at least one first compound selected from the group consisting of phosphoric acid, fully neutralized salts of phosphoric acid, and partly neutralized salts of phosphoric acid, and
   B) at least one second compound other than A), selected from the group consisting of an acid, an anhydride, a lactone, and an amine, with the proviso that the second compound is not a phosphoric anhydride,
   and wherein the polyamide particles are contacted with the aqueous composition at a temperature and a pressure at which the aqueous composition is liquid.

2. The process according to claim 1, wherein the polyamide is selected from the group consisting of PA 6, PA 11, PA 12, PA 46, PA 66, PA 666, PA 69, PA 610, PA 612, PA 96, PA 99, PA 910, PA 912, PA 1212, PA 6T, PA 9T, PA 10T, PA 12T, PA 6I, PA 9I, PA 10I, PA 12I, PA 6T 6I, PA MXD6, PA MACM I, PA MACM T, PA PACM I, PA PACM T and copolymers and mixtures thereof.

3. The process according to claim 1, wherein component B) comprises at least one acid selected from the group consisting of monocarboxylic acids $R^1$—COOH and dicarboxylic acids $R^2$—$(COOH)_2$, in which $R^1$ is hydrogen, $C_1$-$C_{10}$-alkyl or phenyl and $R^2$ is a chemical bond, $C_1$-$C_{10}$-alkylene or phenylene.

4. The process according to claim 1, wherein component B) comprises succinic acid.

5. The process according to claim 1, wherein component B) comprises at least one acid selected from the group consisting of phosphonic acid, phosphinic acid and phosphonates.

6. The process according to claim 1, wherein component B) comprises at least one anhydride selected from the group consisting of:
   aliphatic anhydrides $R^3C(=O)$—O—$C(=O)$—$R^4$, in which $R^3$ and $R^4$ are each independently $C_1$-$C_{10}$-alkyl and
   alicyclic or aromatic anhydrides of the formula in which $R^5$ is $C_2$-$C_6$-alkylene, $C_2$-$C_6$-alkenylene, $C_2$-$C_6$-alkynylene or a divalent saturated or mono- or polyunsaturated or aromatic cyclic radical.

7. The process according to claim 1, wherein component B) comprises at least one lactone selected from the group consisting of γ-lactones, δ-lactones, and ϵlactones.

8. The process according to claim 1, wherein component B) comprises at least one amine selected from the group consisting of ammonia, primary amines $R^6NH_2$, secondary amines $R^6R^7$-$NH_2$, tertiary amines $R^6R^7R^8$-N, quaternary amines $R^6R^7R^8R^9$-$N^+(X^-)$, and diamines $(H_2N)$-$R^{10}$-$(NH_2)$, in which $R^6$, $R^7$, $R^8$, $R^9$ are each independently $C_1$-$C_{20}$- alkyl, $C_3$-$C_8$-cycloalkyl, aryl, $C_7$-$C_{20}$-arylalkyl or $C_8$-$C_{20}$-alkylarylalkyl, $R^{10}$ is $C_2$-$C_{10}$-alkylene and $X^-$ is one anion equivalent.

9. The process according to claim 1, wherein the aqueous composition is sprayed onto the polyamide particles.

10. The process according to claim 9, wherein the spray application of the aqueous composition is effected continuously.

11. The process according to claim 1, wherein the aqueous composition is contacted with the polyamide particles within a period of not more than 30 seconds.

12. The process according to claim 1, wherein the aqueous solution is distributed mechanically on the surface of the polyamide particles.

13. The process according to claim 12, wherein the mechanical distribution is effected by means of mixing and dispersing elements.

14. The process according to claim 1, wherein the aqueous composition comprises 0.25% by weight to 1% by weight of at least one phosphorus-containing component A).

15. The process according to claim 1, wherein the aqueous solution comprises 0.25% by weight to 1% by weight of component B).

16. The process according to claim 1, wherein the prepolymer contains reactive groups, and wherein the molar ratio of component B to the reactive groups in the prepolymer is 1:50 to 1:5.

17. The process according to claim 1, wherein the prepolymer contains amino end groups, wherein component B is selected from the group consisting of acids, anhydrides, and lactones, and wherein the molar ratio of component B to the amino end groups of the prepolymer is 1:50 to 1:5.

18. The process according to claim 1, wherein the prepolymer contains carboxyl end groups, wherein component B is selected from the group consisting of amines and ammonia, and wherein the molar ratio of component B to the carboxyl end groups of the prepolymer is 1:50 to 1:5.

19. The process according to claim 1, wherein component B) consists of succinic acid.

20. The process according to claim 1, wherein the aqueous composition is contacted with the polyamide particles within a period of not more than 10 seconds.

* * * * *